United States Patent
Viaud

(10) Patent No.: US 7,540,524 B2
(45) Date of Patent: Jun. 2, 2009

(54) DEVICE FOR DETECTING A SUPPORT LOAD

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 777 days.

(21) Appl. No.: 11/143,065

(22) Filed: Jun. 2, 2005

(65) Prior Publication Data

US 2005/0283296 A1 Dec. 22, 2005

(30) Foreign Application Priority Data

Jun. 17, 2004 (DE) ................ 10 2004 029 295

(51) Int. Cl.
*B62D 53/02* (2006.01)
*B60D 1/155* (2006.01)
*B60D 1/167* (2006.01)
*B60D 1/50* (2006.01)
*B60D 1/36* (2006.01)
*G01G 19/08* (2006.01)
*G01G 3/14* (2006.01)

(52) U.S. Cl. ............ 280/492; 280/493; 280/494; 280/489; 280/483; 280/477; 280/511; 280/512; 177/136; 177/138; 177/139; 177/211

(58) Field of Classification Search ............. 701/124; 439/162, 163, 165, 2, 6, 11, 35
See application file for complete search history.

(56) References Cited

U.S. PATENT DOCUMENTS 3,650,340 A 3/1972 Bradley
3,669,756 A * 6/1972 Bradley et al. ............ 177/136
3,700,053 A * 10/1972 Glissendorf ................ 177/136
6,150,617 A * 11/2000 Hart et al. ................ 177/25.13
6,534,728 B1 * 3/2003 Spikings ..................... 177/136

FOREIGN PATENT DOCUMENTS

| DE | 195 43 343 | 11/1995 |
| DE | 199 06 611 | 2/1999 |
| DE | 101 240 89 | 5/2001 |
| DE | 201 08 302 | 8/2001 |
| DE | 102 45 001 | 9/2002 |
| DE | 103 15 170 | 4/2003 |
| DE | 101 54 733 | 5/2003 |
| FR | 2 687 622 | 8/1993 |
| WO | WO 97/09592 | 3/1997 |

OTHER PUBLICATIONS

German Search Report, Jul. 17, 2006, 4 Pages.

* cited by examiner

*Primary Examiner*—Thomas G Black
*Assistant Examiner*—Sze-Hon Kong

(57) ABSTRACT

A device for detecting the support load with which a tongue of a trailer vehicle acts on a tractor vehicle. The device includes a first coupling element, a second coupling element that can be detachably connected to the first coupling element, and with a sensor arranged between the tongue or the tractor vehicle and the first coupling element. The sensor is designed to detect the vertical force component acting between the tongue or the tractor vehicle and the first coupling element. The first coupling element is pivotably connected to the tongue or the tractor vehicle such as to be pivotable about a horizontal pivot shaft. The first coupling element is also connected to the second coupling element such as to be movable about an axis running parallel to the pivot shaft.

3 Claims, 2 Drawing Sheets

DEVICE FOR DETECTING A SUPPORT LOAD

BACKGROUND

1. Field of the Invention

The invention relates to a device for detecting the support load with which a tongue of a trailer vehicle acts on a tractor vehicle.

2. Related Technology

There is a need in precision agriculture to detect the weight or the mass of the loads of trailer vehicles. The load can be harvested material that is placed on the trailer vehicle, e.g., in the case of a trailer vehicle in the form of a transport trailer during the harvesting of beets or fodder, or that is pressed to bales in the trailer vehicle, e.g., in a trailer vehicle in the form of a bale press during the harvesting of hay, straw or silage. A position-specific yield chart can be made using the weight values recorded in a geo-referenced manner at certain time intervals.

Since the successive weight changes are at least as relevant as the cumulative total mass, the highest-possible precision is desirable when detecting the weight.

Various devices are known in the state of the art for measuring mass of the load. WO 97/09592 A suggests placing several measuring cells between the loading surface of a transport trailer and its undercarriage. DE 199 06 611 A analogously suggests arranging measuring cells between the pressing chamber housing of a bale press and its undercarriage. Such an arrangement requires that the tongue is also to be connected below the loading surface to the undercarriage. However, in bale presses the pressing chamber housing forms part of the undercarriage so that such an inclusion of measuring cells means a completely new construction of the trailer vehicle, in particular of the bale press.

DE 195 43 343 A suggests detecting the weight forces acting on the axles and the traction tongue of a bale press. The weight force of the bale produced is calculated using the change in forces during the ejection of the bale. DE 102 45 001 A describes an analogous arrangement of the measuring cells in a vehicle for discharging biomass.

The measuring cell built into the traction tongue is intended to detect the vertical load of the traction eyelet, that is, the support load, with which the traction tongue acts on the coupling of the traction vehicle. It is thus arranged in the vertical direction between the traction tongue and the traction eyelet. However, its output signal can be influenced by horizontal forces acting between the trailer vehicle and the tractor vehicle. Errors of measurement can occur thereby, in particularly through tilting of elements that can move relative to each other in the vertical direction if rather high braking forces or tractional forces are active.

DE 203 13 356 U describes a support device for the trailer tongue of a passenger car trailer. A spring is arranged inside a tube, the expansion of which spring is a measurement for the support load with which the trailer tongue acts on a support wheel. The upper end of the spring is connected to the trailer tongue while its lower end is connected via an oscillating arm to the support wheel. The oscillating arm is mounted in such a manner that it can rotate about a horizontal shaft parallel to the axis of rotation of the support wheel. This is intended to avoid a tilting of the movable parts connected to the support wheel and to improve the measuring accuracy. The support force of the support wheel is measured here. Thus, this measuring device is not suited for determining the support load or contact force with which a tongue acts on a coupling of a tractor vehicle.

SUMMARY

The invention solves the basic problem of making available a simple and reliable measuring device for detecting the support load of a tongue of a transport vehicle for harvest material on a coupling of a tractor vehicle in which the measuring accuracy is increased.

The invention solves this problem with a coupling device arranged between a tractor vehicle and the tongue of a trailer vehicle, the device including first and second coupling elements that can be connected to one another in a separable manner. A sensor for detecting the support load that the trailer vehicle transfers to the tractor vehicle is arranged between the first coupling element and tongue or the tractor vehicle and detects the vertical force component acting there during operation.

In order to improve the measuring accuracy and in particular to avoid falsifications by a tilting of the elements adjacent to the sensor to transfer the horizontal forces and to avoid falsifications of the measured values resulting therefrom, the first coupling element is connected to the tongue or to the tractor vehicle in such a manner that it can pivot about a horizontal pivot shaft running transversely to the forward direction of the tractor-trailer vehicle. The first coupling element is placed on the second coupling element such as to be pivotable about an axis running parallel to this pivot shaft. The axis and the pivot shaft are in a common horizontal plane (or in a common plane in which the tractional or braking forces to be expected extend), at least when the tractor vehicle is loaded with an expected load. The sensor can be attached at an interval from the pivot shaft. This causes the horizontal tractional forces to be transferred via the pivot mounting of the first coupling element.

The rotatable mounting of the first coupling element on the pivot shaft and the axis and the arrangement of the shaft and the axis in a single plane that is horizontal or arranged in a suitable direction in which the tractional forces extend, yield the effect that the position of the first coupling element remains independent of horizontal tractional and braking forces. The vertical force components are detected by the sensor. Falsifications of the measured values due to braking or tractional forces are therefore not longer to be expected. The device in accordance with the invention is distinguished by high accuracy. In the range of the loads to be expected, the first coupling element preferably moves only slightly in order that the pivot shaft and the axis remain in the same horizontal plane.

In a possible embodiment the sensor is arranged on the tractor vehicle side. The tongue of the trailer vehicle is then connected to the second coupling element while the first coupling element is coupled to the tractor vehicle and the sensor is located between the first coupling element and the tractor vehicle. This device make possible a highly accurate determination of the support load in all types of vehicles. The measured value of the sensor can be displayed to the driver of the tractor vehicle and a warning can be given if an admissible maximum value is exceeded.

In another embodiment the sensor is located on the trailer vehicle. The tractor vehicle is then provided with the second coupling element while the first coupling element is pivotably articulated to the tongue and the sensor is also located in the vertical force flow between the tongue and the first coupling element.

The first coupling element can extend in the manner of a counterpoise in the forward direction in front of and behind the pivot shaft. It can be connected to the second coupling element on one side of the pivot shaft. The sensor can be arranged on the other side of the pivot shaft. A translation of forces can take place by a suitable selection of lever arms in order to adapt the force range to be expected to the particular sensor used. However, the sensor could be arranged on the same side of the pivot shaft on which the second coupling element is also present in other embodiments.

The sensor can be arranged inside the first coupling element, that is, be integrated in it, so that it detects the vertical support load of the trailer vehicle. In particular, a known load cell assembly can be considered in this connection that is arranged in the vertical direction between the first coupling element and another element.

The other element can be connected directly to the tongue or to the tractor vehicle or can be arranged between two stops that make possible a low vertical play. The sensor can also be designed as a wire strain gauge attached externally to the first coupling element in order to detect a deformation of the first coupling element caused by the support load of the trailer vehicle.

It is furthermore possible to position the element between the sensor and the tongue or the tractor vehicle which element is located between two upper and lower stops leaving some free play. When the trailer vehicle is empty, the element is preferably located in the area of play between the stops whereas when the trailer vehicle is loaded, it rests on one of the stops.

As explained above, a certain pivot range is desirable between the first and the second coupling element about the horizontal axis running transversely to the forward direction. It can also be realized by a ball end coupling. A combination of an open-mouth coupling with a traction eyelet provided with sufficient play to allow pivot movement about said axis would also be conceivable. Alternatively or additionally, an appropriate articulation can be built into the first coupling element in order to achieve or enlarge the pivot range.

The described device is particularly suitable for detecting the support load of a trailer vehicle for transporting or receiving of harvested material, e.g., of a bale press or of a loading wagon. If the shaft loads of the trailer vehicle are also detected, a yield chart of the harvested material received can be made by geo-referenced recording of the measured values of the sensors for the support load and the shaft loads.

Further objects, features and advantages of this invention will become readily apparent to persons skilled in the art after a review of the following description, with reference to the drawings and claims that are appended to and form a part of this specification.

DETAILED DESCRIPTION

Figure 1:
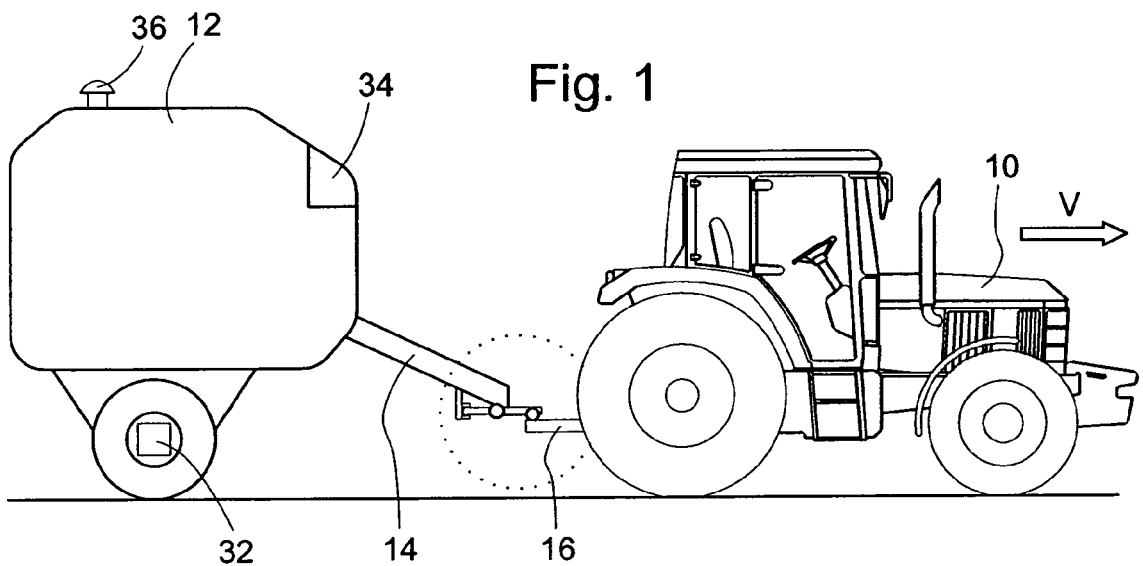
FIG. 1 shows a lateral view of a tractor vehicle, in the form of a tractor, and of a trailer vehicle, in the form of a bale press.

FIG. 1 shows a lateral view of tractor vehicle 10, in the form of a tractor, and shows trailer vehicle 12 pulled by it in the form of a bale press. Instead of the round ball press shown, a parallelepipedic bale press, a loading wagon, a transport trailer for harvested material or any other trailer, such as a transport carriage for boats or devices or a mobile home, could also be pulled by tractor vehicle 10. Any desired embodiments can also be considered as tractor vehicle 10.

Figure 2:
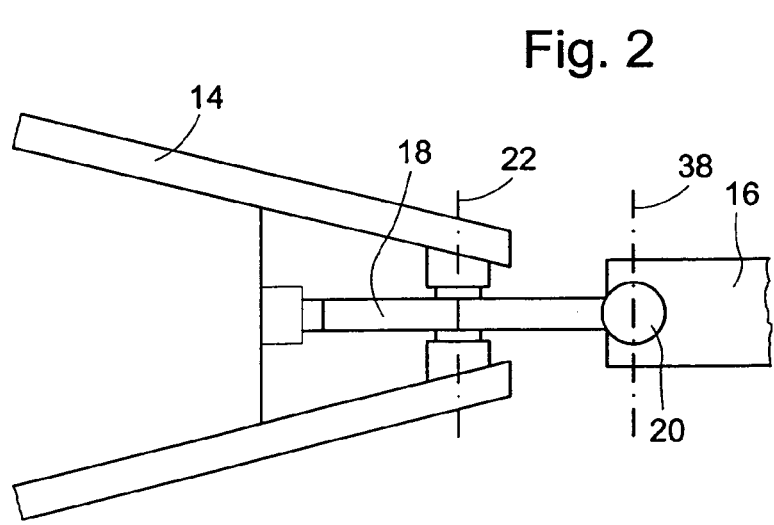
FIG. 2 shows a top view onto the tongue of the trailer vehicle and the traction rod of the tractor vehicle.
Figure 3:
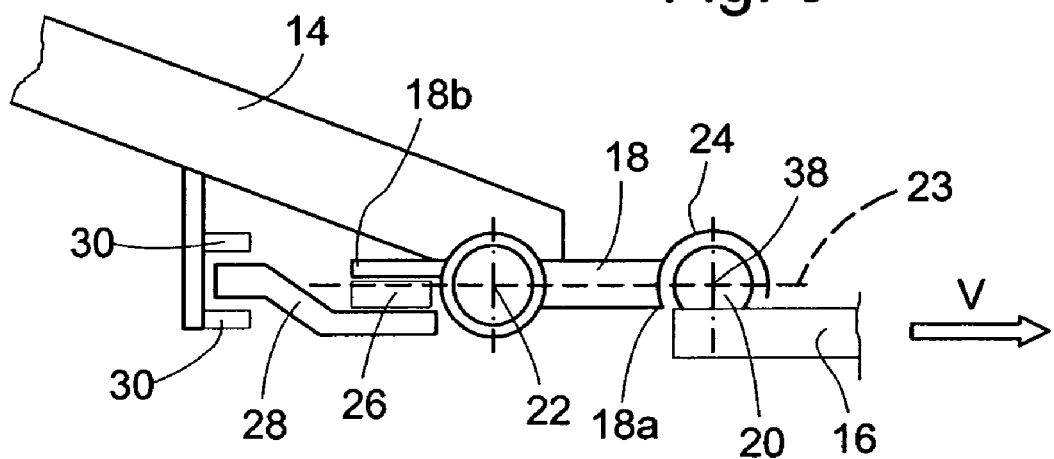
FIG. 3 shows a lateral view of the tongue of the trailer vehicle and of the traction rod of the tractor vehicle as well as a sensor for detecting the support load.

FIGS. 2 and 3 show tongue 14 of the trailer vehicle and traction rod 16 of tractor vehicle 10, as well as the coupling elements arranged between them for the detachable connection of tongue 14 and traction rod 16 in a top view (FIG. 2) and in a lateral view (FIG. 3). The coupling elements comprise a first coupling element 18 and a second coupling element 20. First coupling element 18 is articulated approximately in its middle to tongue 14 in such a manner that it can pivot about horizontal pivot shaft 22 running transversely to forward direction V. First coupling element 18 comprises ball socket 24 on its front end 18a (in forward direction V). This ball socket surrounds spherical second coupling element 20, which is permanently or otherwise rigidly connected to traction rod 16. First coupling element 18 can be removed from second coupling element 20 in order to separate the coupling connection and to be able to release trailer vehicle 12 from tractor vehicle 10. Ball socket 24 and spherical second coupling element 20 permit a pivoting of first coupling element 18 about axis 38 running through the middle of ball 20 and parallel to pivot shaft 22. Instead of the ball end coupling shown, any other type of coupling can be used, especially combinations of traction eyelets on the trailer vehicle side and open-mouth couplings suitable for receiving them on the tractor vehicle side.

A rear end 18b of the first coupling element 18, that is located behind pivot shaft 22 relative to forward direction V, is connected with sensor 26 in the form of a force measuring cell or a wire strain gauge. Element 28 is attached to the other surface of sensor 26 and extends between two stops 30 connected to tongue 14. If the support load of trailer vehicle 12 is approximately zero, element 28 is in the middle between stops 30. Element 28 rests on lower stop 30 in the case of downwardly directed support loads. If tongue 14 draws traction rod 16 upward, element 28 rests on upper stop 30.

During operation sensor 26 detects the vertical support load that tongue 14 exerts on traction rod 16. Horizontal traction forces are received by the pivot mounting with pivot shaft 22 and do not falsify the measured result. Since axis 38 and pivot shaft 22 are located in the same horizontal plane 23, tractive forces or braking forces are also not converted into vertical movements of first coupling element 18 that would falsify the measured results of sensor 24.

In another possible embodiment, element 28 is designed as one part with first coupling element 18 and a wire strain gauge as sensor 26 detects the deformation of first coupling element 18 caused by the support load.

Figure 4:
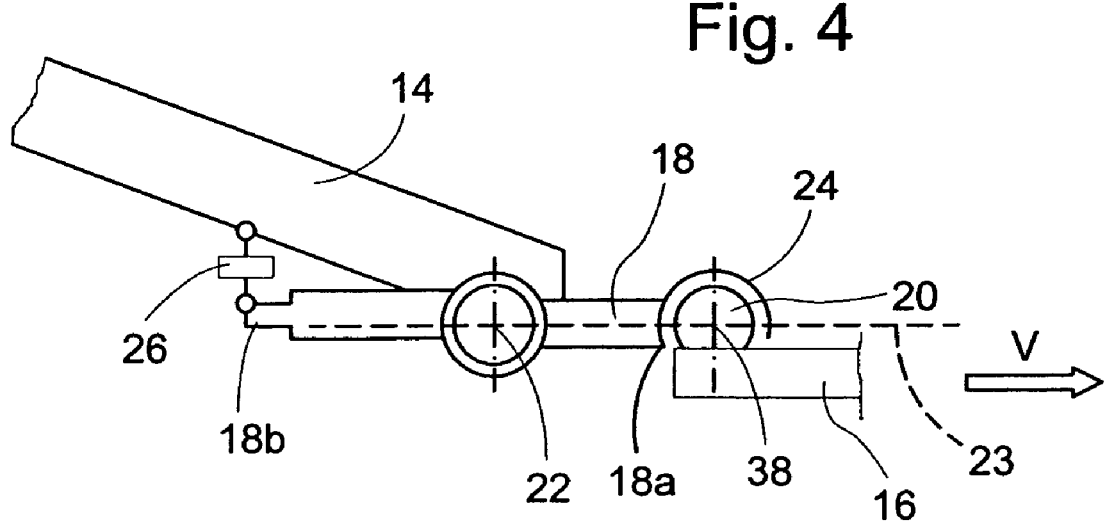
FIG. 4 shows a lateral view of another embodiment of the tongue of the trailer vehicle and of the traction rod of the tractor vehicle with a sensor for detecting the support load.

In the embodiment according to FIG. 4, in which elements coinciding with the first embodiment are characterized with the same reference numerals, sensor 26 is arranged directly between tongue 14 and rear end 18b of first coupling element 18. When tongue 14 exerts a support force on coupling element 18, sensor 26 is traction-loaded.

Trailer vehicle 12 is provided with sensors 32 for detecting the axle load, a GPS antenna 36 for position detection and with computer 34 with a transmission device and/or memory device. Computer 34 records the values of sensors 26, 32 and location during operation or transmits this information to a remote location in order to prepare yield charts. Computer 34 and/or GPS antenna 36 can alternatively be on tractor vehicle 10.

Alternatively, the construction described above can be reversed such that the first coupling element 18 and related structures are mounted and supported with respect to the traction rod 16 of the tractor vehicle 10 (instead of the tongue 14 of the trailer vehicle 12). Similarly, the second coupling element 20 could be mounted and supported with regard to the tongue 14 of the trailer vehicle 12 (instead of the traction rod 16 of the tractor vehicle 10).

It is therefore intended that the foregoing detailed description be regarded as illustrative rather than limiting, and that it be understood that it is the following claims, including all equivalents, that are intended to define the spirit and scope of this invention.

What is claimed is:

1. A device for detecting a support load between a trailer vehicle and a tractor vehicle, comprising:

said trailer vehicle having a forwardly projecting tongue;

a horizontal, transverse pivot shaft being fixed to said tongue;

a fore-and-aft extending first coupling element having a location intermediate front and rear ends of said coupling element pivotably coupled to said pivot shaft such as to be pivotable about said pivot shaft;

a sensor arranged between the rear end of said first coupling element and the tongue to detect a vertical force component acting therebetween;

a second coupling element mounted to a rear end of said tractor vehicle configured to be detachably connected to the front end of said first coupling element such that the first coupling element is movable about an axis running parallel to the pivot shaft, wherein the axis and the pivot shaft are both at least approximately located within a common horizontal plane;

said rear end of said first coupling element having a downwardly facing surface;

a fore-and-aft extending third element having a forward end disposed beneath, and including an upwardly facing surface disposed in confronting relationship to said downwardly facing surface of said first coupling element;

said sensor being one of a force measuring cell or a wire strain gauge located between said downwardly and upwardly facing surfaces and having top and bottom surfaces respectively fixed to said downwardly and upwardly facing surfaces; and said tongue being provided with vertically spaced, lower and upper stops respectively located above and below a rear end of said third element, with said rear end of said third element being located between, and free of, said stops when said trailer vehicle exerts a support load of approximately zero on said second coupling element, and with the third element resting on the lower stop in the case of downwardly directed support loads being imposed on said second coupling element by said trailer.

2. The device according to claim 1, wherein the second coupling element includes a ball end coupling.

3. The device according to claim 1, wherein the trailer includes an axle and the device further includes:

a second sensor mounted on said axle for detecting an axle load of the trailer vehicle; and a geo-referenced recording means being mounted on one of said trailer vehicle or tractor vehicle and coupled to said second sensor for recording measured values of the second sensor.

\* \* \* \* \*